United States Patent [19]

Umebayashi et al.

[11] Patent Number: 4,608,550
[45] Date of Patent: Aug. 26, 1986

[54] ELECTRIC SIGNAL TRANSMISSION SYSTEM ON A ROAD VEHICLE

[75] Inventors: Kazuyuki Umebayashi; Nobuyasu Suzumura, both of Tokyo, Japan

[73] Assignee: Aisin Seiki Kabushikikaisha, Japan

[21] Appl. No.: 399,582

[22] Filed: Jul. 19, 1982

[30] Foreign Application Priority Data

Aug. 25, 1981 [JP] Japan ................................ 56-132926
Aug. 25, 1981 [JP] Japan ................................ 56-132927
Aug. 26, 1981 [JP] Japan ................................ 56-133579

[51] Int. Cl.$^4$ .............................................. G08C 1/00
[52] U.S. Cl. .......................................... 340/22; 180/78; 307/10 R; 340/870.31
[58] Field of Search ............... 74/484 R, 492, 496, 74/497, 552; 180/78; 340/22, 870.31; 455/78; 307/10 R

[56] References Cited

U.S. PATENT DOCUMENTS

| 1,944,905 | 1/1934 | Rowell ................................ 180/78 |
| 2,206,512 | 7/1940 | Reinholz .............................. 180/78 |
| 3,867,699 | 2/1975 | Stoffer ................................. 455/78 |
| 3,876,998 | 4/1975 | Richter ............................ 340/870.31 |
| 4,048,561 | 9/1977 | Wilcox ................................. 455/78 |
| 4,157,854 | 6/1979 | Beauch . |
| 4,225,851 | 9/1980 | Reschovsky .................... 340/870.26 |
| 4,242,666 | 12/1980 | Reschovsky .................... 340/870.37 |
| 4,354,190 | 10/1982 | Reschovsky .................... 340/870.18 |
| 4,368,454 | 1/1983 | Pilatzki ................................ 340/22 |
| 4,404,559 | 9/1983 | Renner ........................... 340/870.31 |
| 4,442,515 | 4/1984 | Meitzler ............................ 307/10 R |

FOREIGN PATENT DOCUMENTS

| 0047498 | 3/1981 | European Pat. Off. . |
| 197810 | 10/1978 | France ................................ 180/78 |
| 2039346 | 8/1980 | United Kingdom .................. 180/78 |

Primary Examiner—John W. Caldwell, Sr.
Assistant Examiner—Michael F. Heim
Attorney, Agent, or Firm—Sughrue, Mion, Zinn, Macpeak, and Seas

[57] ABSTRACT

Communication of electric signals between a control board mounted on a steering wheel but held in stationary state irrespective of a rotation of the steering wheel and an electric controller disposed at a position remote from a steering mechanism. The control board is supported by a steering drive shaft through a toothed wheel mechanism, so that it remains stationary regardless of a rotation of the shaft. The control board and the electric controller are electrically coupled to each other through a combination of slip rings and brushes, a pair of coils, or two pairs of coils. The control board and the electric controller include each an FSK modulation circuit, an FSK demodulation circuit and a microprocessor for controlling transmission or reception of the electric signals. Key inputs on the control board are encoded by the control board and then transmitted to the electric controller. The electric controller decodes the received code and then renders operation instructions to load-vehicle equipments.

11 Claims, 26 Drawing Figures

ELECTRIC SIGNAL TRANSMISSION SYSTEM ON A ROAD VEHICLE

BACKGROUND OF THE INVENTION

The invention relates to transmission of electric signals between a control board secured at the center of a steering wheel of a vehicle but in a floating state with respect to the steering wheel and an electric controller fixed on the vehicle.

Among the parts on a vehicle, a steering wheel is located nearest to a driver and within easy access of the driver's hands. Therefore, in order to improve the operability of road-vehicle electric and electronic equipments it is preferable that a control board including key switches used for providing control instructions to the equipments is mounted at the center of the steering wheel in a floating and hence stationary state with respect to the steering wheel.

However, a steering mechanism for transmitting a rotation of the steering wheel to a steering shaft has a complex structure, so it is difficult to make the wiring of signal cables for connecting the control board mounted at the center of the steering wheel (referred to as a steering control board hereinafter) to an electric controller fixed on the vehicle. To facilitate the wiring work, distributing pipes and/or connecting slip rings must be added in the steering mechanism without impairing operation of the mechanism and, in addition, a space allocated for the steering mechanism is limited, so that the wiring is only accomplished with great difficulty.

SUMMARY OF THE INVENTION

A first object of the invention is to mount a control board on a steering wheel in a stationary state, and a second object of the invention is to practically dispense with electric cables for use in communicating electric signals between the control board and a road-vehicle fixed electric controller without causing the steering wheel section to be remarkably complicated in its structure or to be largely increased in its volume.

According to the invention, electric signals are transmitted between the control board and the fixed electric controller through a combination of slip rings and brushes or a pair of electric coils, and power is fed from the fixed electric controller to the control board also through a combination of slip rings and brushes or a pair of electric coils. For the purpose of preventing noise from mixing with the electric signal, and for facilitating removal of noise from the electric signal, the control board and the road-vehicle electric controller include modulation and demodulation circuits and a transmitting/receiving control device, respectively.

In a preferred embodiment of the invention, the control board on the steering wheel is connected to a power line of a battery fixed on the vehicle through a combination of slip rings and brushes. The control board includes therein the modulation and demodulation circuits and the transmitting/receiving control device as well as key switches for providing control instructions to road-vehicle equipment, thereby to send a code in accordance with the key switch operation to the power line through a carrier wave. The road-vehicle fixed electric controller includes the modulation and demodulation circuits and the transmitting/receiving control device, thereby to reproduce the original code from the carrier appearing on the power line. As required, the control board may include therein a display means such as lamps, light emitting diodes, a character display or a two-dimensional graphic display and/or an informing means such as a speaker. The fixed electric controller sends a control signal to the power line through a carrier wave, while the control board reproduces the control signal from the carrier appearing on the power line. Source voltage is applied to the control board through the slip rings and brushes. The carrier wave modulated with the electric signals is transmitted from the control board to the fixed electric controller or vice versa.

In another preferred embodiment of the invention, the control board on the steering wheel is connected to the power line of the battery through the slip rings and brushes. The electric signals are superimposed on the carrier wave and then sent from the control board to the fixed electric controller or vice versa through a pair of electric coils opposite to each other.

In still another preferred embodiment of the invention, the fixed electric controller feeds power to the control board on the steering wheel through a pair of electric coils. The electric signals are superimposed on the carrier wave and then sent from the control board to the fixed electric controller or vice versa through another pair of electric coils opposite to each other.

Other objects and features of the invention will become apparent upon reading the description of the following embodiments with reference to the drawings.

DESCRIPTION OF EMBODIMENTS

Figure 1A:
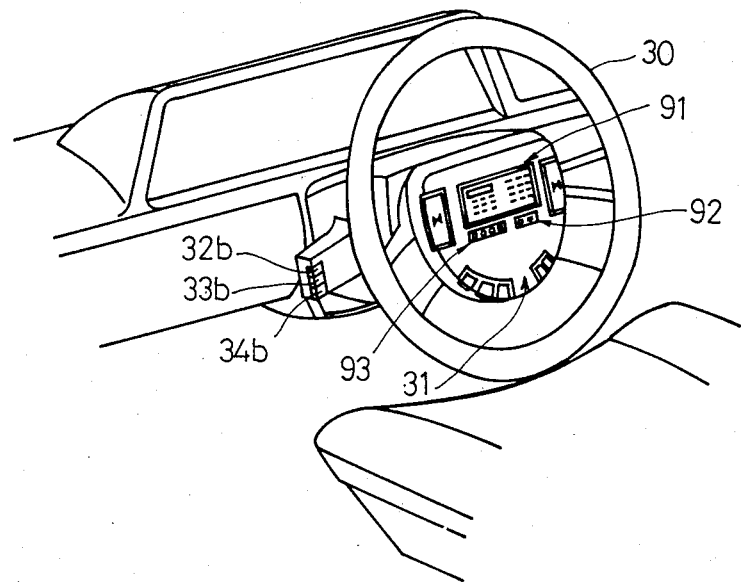
Fig. 1a is a perspective view of a control board 31 mounted on a steering wheel 30 in a floating state with respect to the same.
Figure 1B:
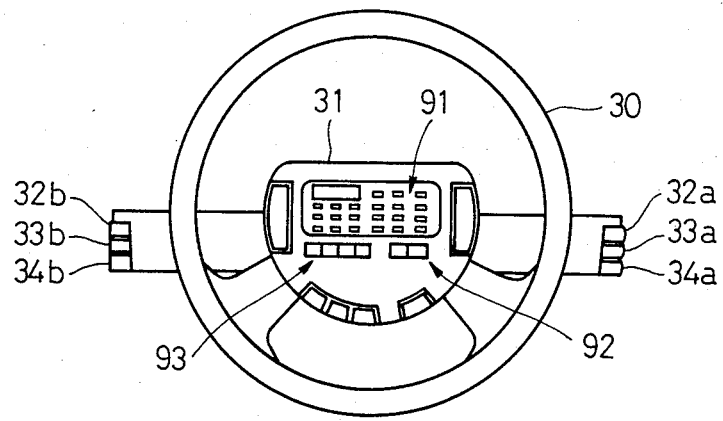
FIG. 1b is a front view of the control board 31 mounted on the steering wheel 30 in a floating state with respect to the same.

FIGS. 1a and 1b show a steering wheel of a vehicle and its surroundings in accordance with an embodiment of the invention. Referring to FIGS. 1a and 1b, a control panel 31 for a wheel attitude controlling device is attached to the center of a steering wheel 30. Three switches 32a, 33a and 34a locating on the right side of the steering wheel 30 are used for controlling a tilt angle. The numeral 32a denotes an UP switch for tilting the steering wheel 30 upward to correct its inclination (or tilt angle), the numeral 33a denotes a DOWN switch for tilting the steering wheel 30 downward to correct its inclination, and the numeral 34a denotes an AWAY switch for setting the inclination of the steering wheel to a tilt away (upper limit retreated) position or for returning the steering wheel from the tilt away position to the original driving position.

Three switches 32b, 33b and 34b located on the left side of the steering wheel 30 are used for controlling the height of the steering wheel. The numeral 32b denotes an UP switch for allowing upward movement, the numeral 33b denotes a DOWN switch for allowing downward movement, and the numeral 34b denotes an AWAY switch for allowing the steering wheel to be elevated to a height away (upper limit retreated) position or returned to the driving position when it is located at the height away position.

Figure 1C:
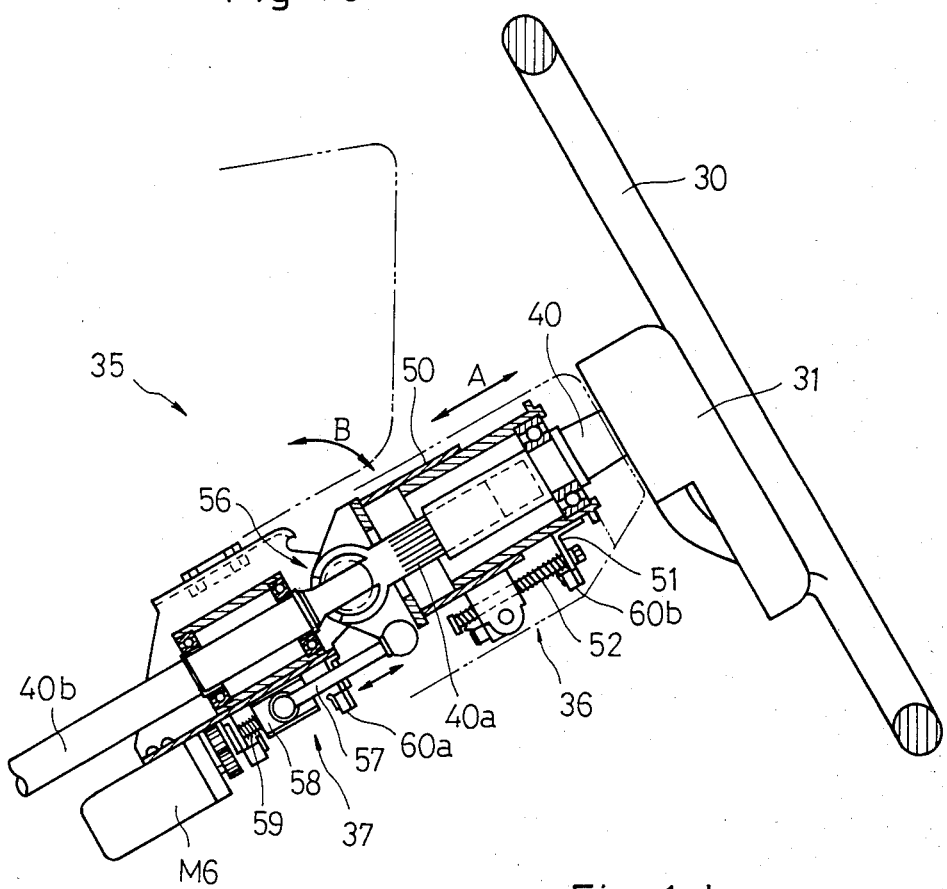
FIG. 1c an enlarged longitudinal sectional view of a steering shaft telescoping mechanism 36 adapted to support the steering wheel 30.

Fig. 1c is a side view of a control section 35 of a steering mechanism. The control section 35 is roughly divided into the steering wheel 30, control panel 31, steering shaft telescoping mechanism 36 and a tilting mechanism 37.

A shaft 40b is rotatable at a fixed position and the shaft 40a is coupled to the shaft 40b through a universal joint 56 so as to be adjustable in its inclination (or tilt angle) in the direction indicated by an arrow B. The reference numeral 57 denotes an arm having one end which is connected to the fixed part of the telescoping mechanism 36 at a position spaced downwardly from the universal joint 56 serving as a fulcrum for the tilting motion and the other end which is connected to a nut 58 on the driving side. The nut 58 is in mesh with the threaded bolt 59 which is driven for rotation by a motor M6. Therefore, a rotation of the motor M6 allows the threaded bolt 59 to turn but causes the nut 58 not to turn, so that the nut 58 is moved in the axial direction (i.e. the direction indicated by the arrow A) and then the arm 57 is driven to turn the movable parts in the tilting mechanism about the universal joint 56. The reference numerals 60a, 60b in FIG. 2a denote limit switches used for detecting upper limit positions of the movable parts in the tilting mechanism and the telescoping mechanism, respectively.

Figure 1D:
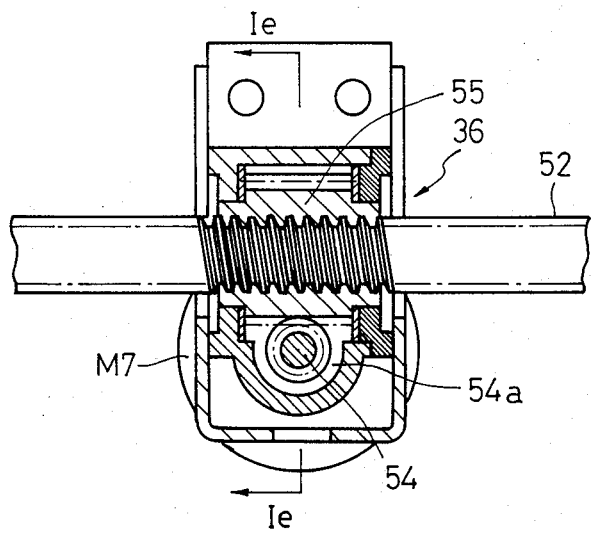
Fig. 1d is an enlarged longitudinal sectional view of a part of the steering shaft telescoping mechanism 36 shown in Fig. 1c.
Figure 1E:
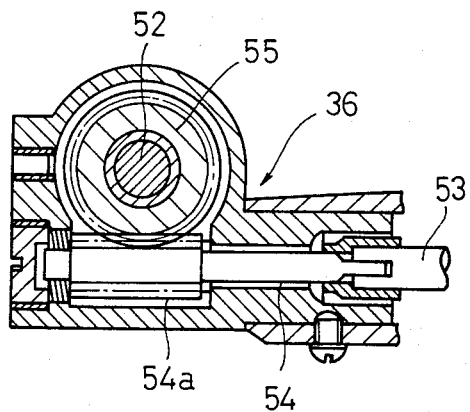
Fig. 1e is a sectional view taken along the line Ie—Ie in FIG. 1d.

FIG. 1d is an enlarged sectional view of a driving section of the steering shaft telescoping mechanism 36, and FIG. 1e is a sectional view taken along the line Ie—Ie in FIG. 1d. The steering shaft telescoping mechanism 36 functions to move the steering wheel 30 forward or backward relative to the driver and is driven by a motor M7 in this embodiment. The main shaft 40 is fitted to a shaft 40a slidable not in the rotational direction but in the axial direction indicated by an arrow A. A guide member 50 on the fixed side mounts thereon the driving section including the motor M7, which drives a threaded bolt 52 fixedly attached to a bracket 51 on the movable side. A shaft 53 of the motor M7 is coupled to a worm shaft 54, while a worm gear 54a formed on the worm shaft 54 is meshed with the threaded outer peripheral surface of a nut 55. The nut 55 is engaged with the threaded bolt 52 and rotatable at a fixed position, so that upon the rotation of the motor M7 the worm gear 54a is turned and this causes the nut 55 to rotate and then the threaded bolt 52 to move forward (or backward) in the axial direction indicated by the arrow A. Consequently, the movable parts including the steering wheel 30 are moved forward or backward in the axial direction of the main shaft 40, i.e. in the direction indicated by the arrow A, while being guided by the guide member 50. Upon this, the steering wheel 30 is elevated or lowered.

Figure 2A:
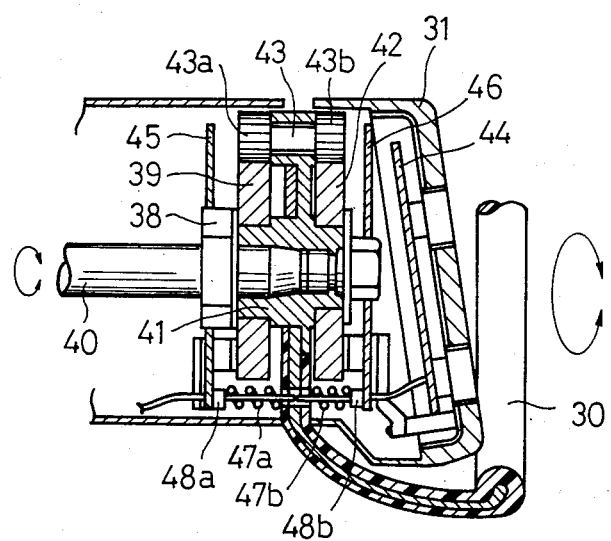
FIG. 2a is a longitudinal sectional view showing a combination of slip rings 45, 46 and brushes 48a, 48b in accordance with a first embodiment of the invention.

FIG. 2a is a sectional view showing a support structure for the steering wheel 30 and the control panel 31. A support 38 and a toothed wheel 39 are fixedly attached to a vehicle body, while a steering main shaft 40 is rotatably retained by the support 38. A support 41 is coupled to the steering wheel 30 and the steering main shaft 40 while rotatably supporting the toothed wheels 39, 42 and a connecting member 43. The connecting member 43 includes at both ends thereof toothed wheels 43a, 43b having the same number of teeth as the toothed wheels 39, 42 and in mesh therewith, respectively. The control panel 31 and a printed circuit board 44 including an attitude control circuit are fixedly mounted to the toothed wheel 42. Slip rings 45, 46 are fixedly mounted to the support 38 and the control panel 31, respectively, while brushes 48a and 48b are pressed against the slip rings 45 and 46 respectively by the action of compressed coil springs 47a and 47b, thereby to electrically conduct between the slip rings 45 and 46. In addition, the toothed wheels 39, 42 have the number of teeth equal to each other.

The above stated construction aims to prevent the control panel 31 from turning together with rotation of the steering wheel 30. In this embodiment, when the steering wheel 30 is rotated, the support 41 and the steering main shaft 40 are turned for the steering operation. On this occasion, since the toothed wheels 43a, 43b have the same number of teeth as the toothed wheels 39, 42, respectively, an arc-shaped movement of the connecting member 43 due to the turning of the support 41 produces relative movements not only between the support 41 and the toothed gear 39 but also between the support 41 and the toothed gear 42. But the extents (or angles) of such relative movements are equal to each other. As a result, the toothed wheel 42 is not rotated with respect to the toothed wheel 39 and, hence, the rotation of the steering wheel 30 will not cause the control panel 31 to be turned. The power is fed to the printed circuit board 44 through the slip rings 45, 46 and the brushes 48.

Figure 2B:
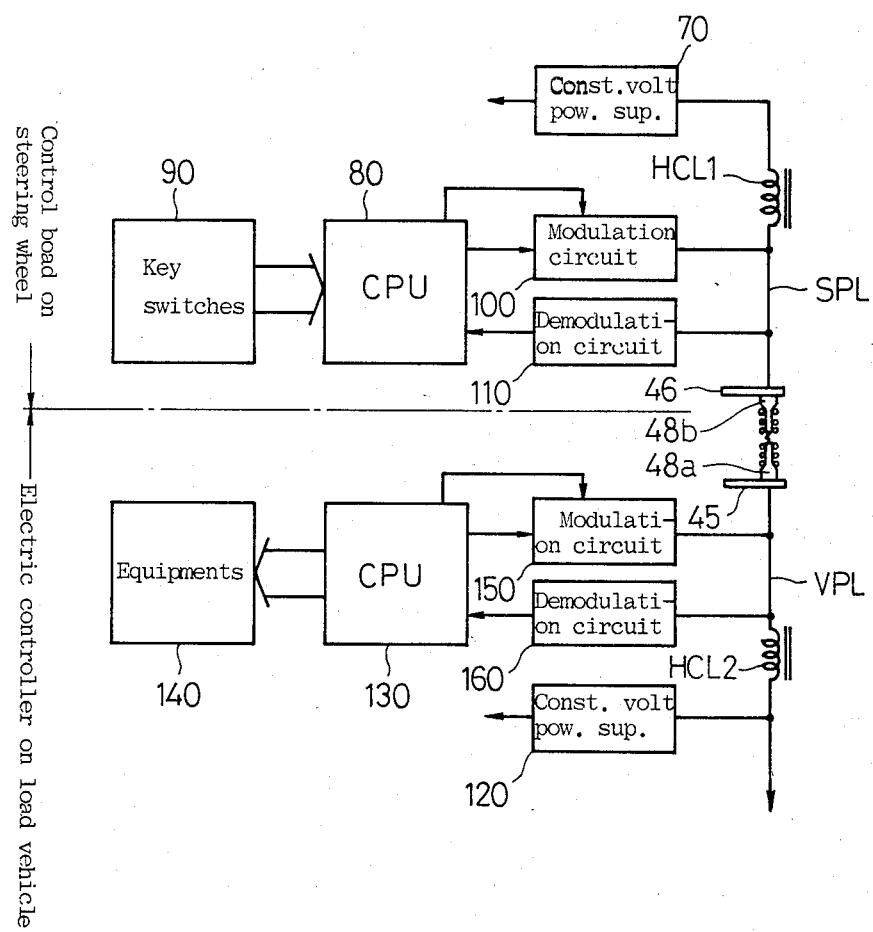
FIG. 2b is a block diagram showing a schematic constitution of the first embodiment.

Referring to FIG. 2b, the control board 31 includes therein a constant voltage power supply unit 70, a microcomputer unit 80 serving as a transmitting control device, key switches 90, an FSK (Frequency Shift Keying) modulation circuit 100, an FSK demodulation circuit 110 and a coil HCL1 for interrupting high frequency. A fixed electric controller located on the side of a road-vehicle battery includes therein a constant voltage power supply unit 120, a microcomputer unit 130 serving as a receiving control device, an FSK modulation circuit 150, an FSK demodulation circuit 160 and a coil HCL2 for interrupting high frequency. Various kinds of equipments 140 are connected to the microcomputer unit 130.

The constant voltage power supply unit 120 is directly connected to a power line of the road-vehicle battery, while the slip ring 45 fixed on the vehicle side is connected to the power line through the coil HCL2. An output terminal of the FSK modulation circuit 150 and an input terminal of the FSK demodulation circuit 160 are connected to the slip ring 45. The brush 48a is brought into contact with the slip ring 45 and the other brush 48b connected to the brush 48a is brought into contact with the slip ring 46 fixed on the control board side. As described later, the slip rings 45, 46 are stationary, but the brushes 48a, 48b are turned upon a rotation of the steering wheel. To the slip ring 46 there are connected an output terminal of the FSK modulation circuit 100, an input terminal of the FSK demodulation circuit 110 and one end of the coil HCL 1. The other end of the coil HCL 1 is connected to the constant voltage power supply unit 70. The reference symbol SPL denotes a power line on the control board side, while VPL denotes a power line on the electric controller side. These power lines are connected to each other through the slip rings 45, 46 and the brushes 48a, 48b, and hence function as lines for transmitting or receiving an FSK modulation wave.

Figure 2C:
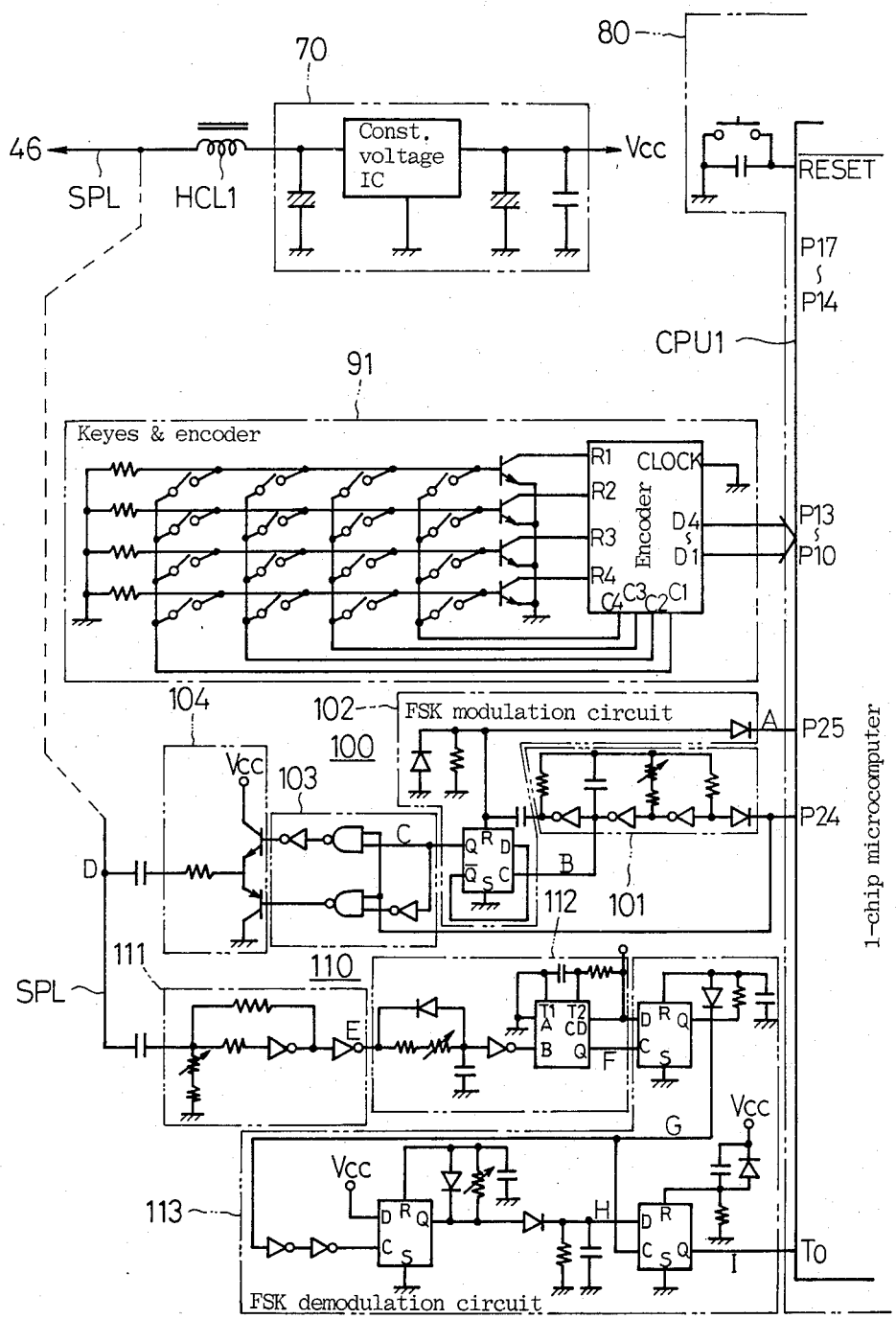
FIG. 2c and 2d are block diagrams showing a constitution of an electric unit incorporated in the control board 31 in accordance with the first embodiment, the entire electric unit being shown by joining the block diagrams shown in FIGS. 2c and 2d together.
Figure 2D:
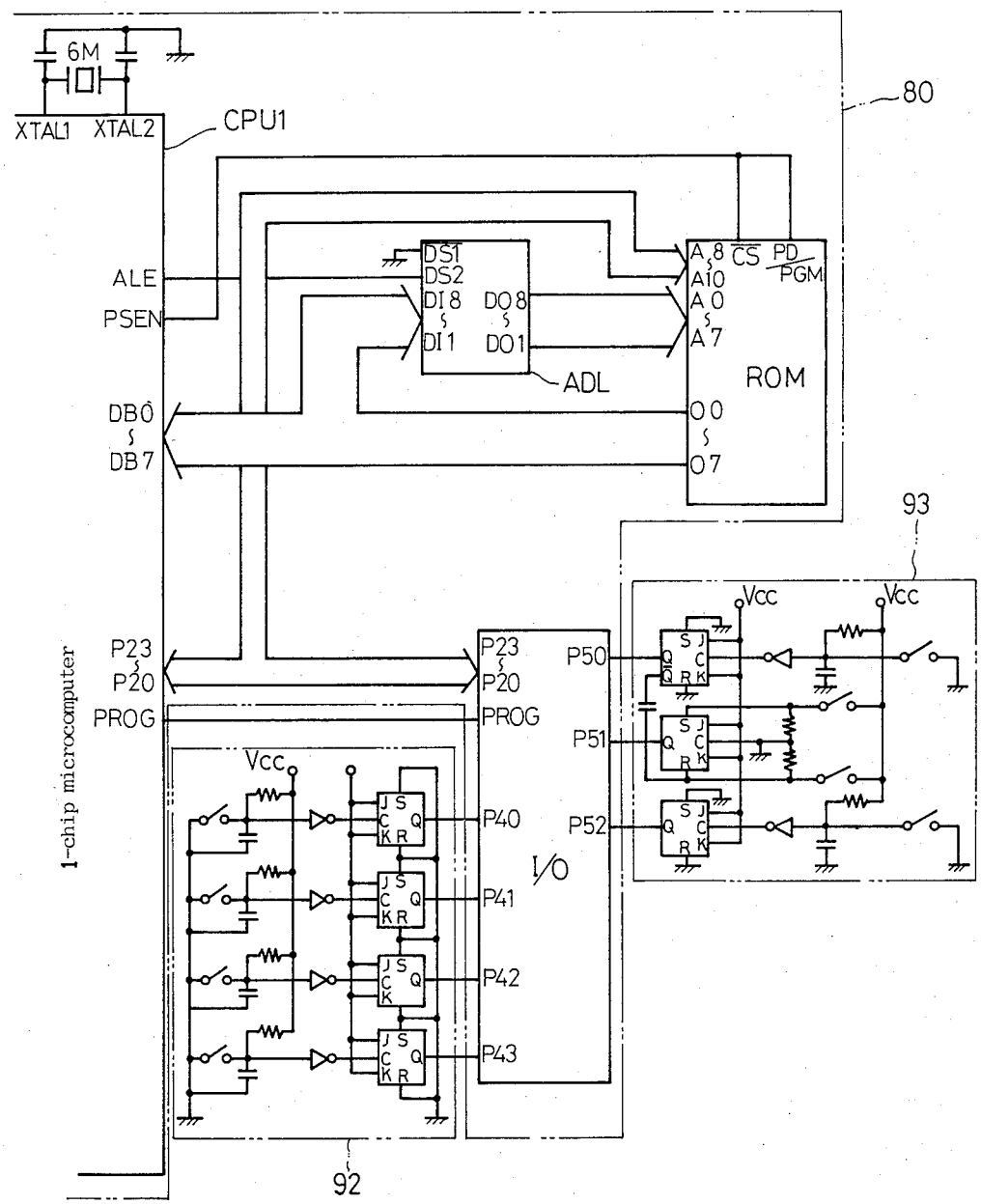

Referring to FIGS. 2c and 2d there is shown in detail an electric circuit unit of the control board 31, the key switches 90 shown in FIG. 2b comprise a key input section 91 (FIG. 2c) which includes a combination of momentary key switches closed only while the keys are being depressed and a key encoder, and control switch input sections 92, 93 (FIG. 2d) which include control switches closed when depressed once and opened when depressed again, and flip-flops adapted to latch a state.

The FSK modulation circuit 100 comprises a pulse oscillator 101, an FSK modulator 102, an output cut-off gate 103 and a transmitting driver 104, whereas the FSK demodulation circuit 110 comprises an amplifying-/waveform shaping circuit 111, a noise interrupting circuit 112 and an FSK demodulator 113. The microcomputer unit 80 comprises 1-chip microcomputer CPU1, an address latch ADL, a semiconductor read only memory ROM, input/output ports I/O, a reset switch and a clock pulse oscillator. The ROM stores therein key input reading program data and transmitting control program data, the latter data of which functions to form a transmitting code in accordance with a change of the key state and then transmit the thus formed code.

Figure 2E:
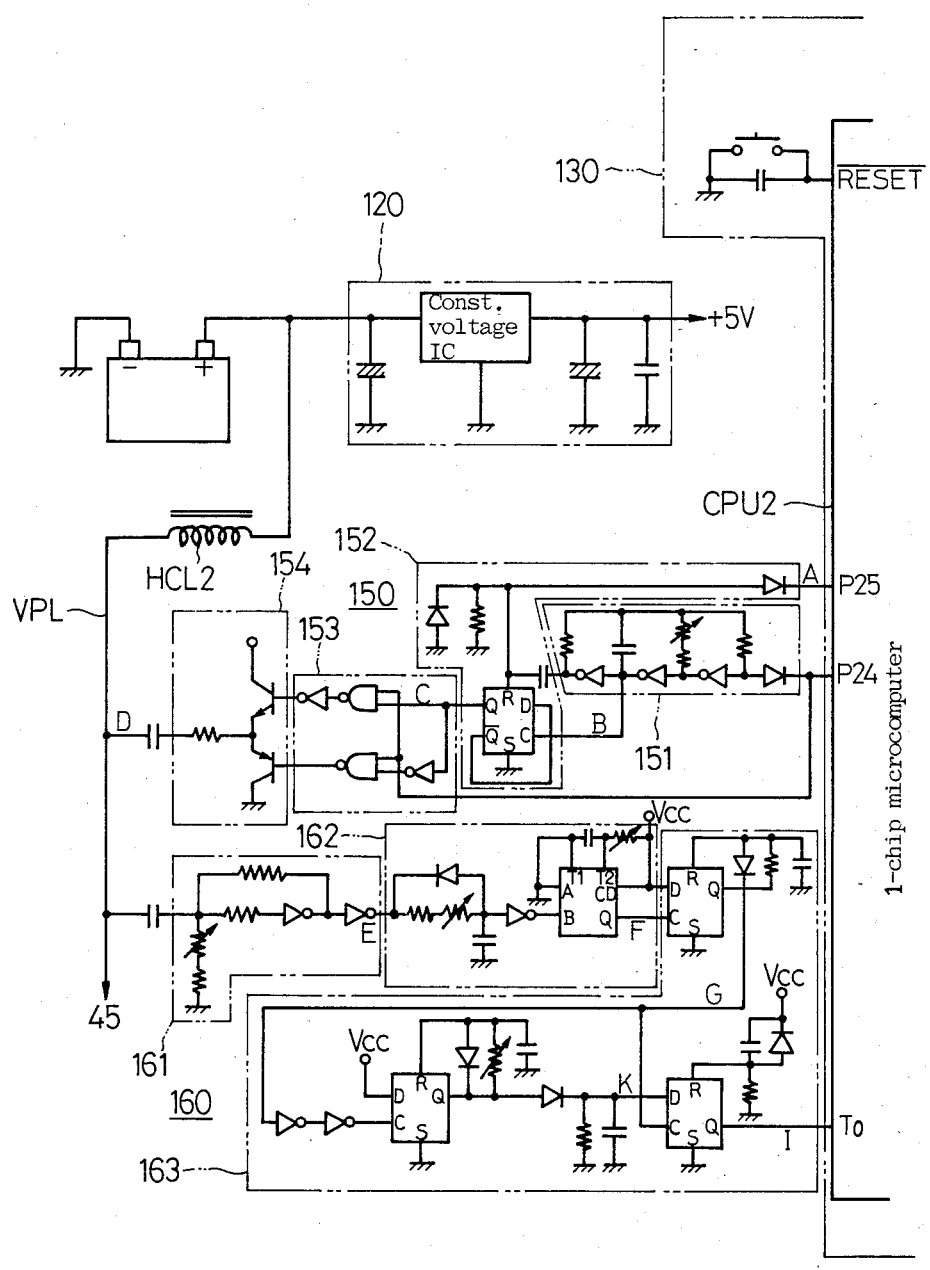
FIGS. 2e and 2f are block diagrams showing a constitution of a road-vehicle fixed electric controller in accordance with the first embodiment, the entire electric controller being shown by joining the block diagrams shown in FIGS. 2e and 2f together.
Figure 2F:
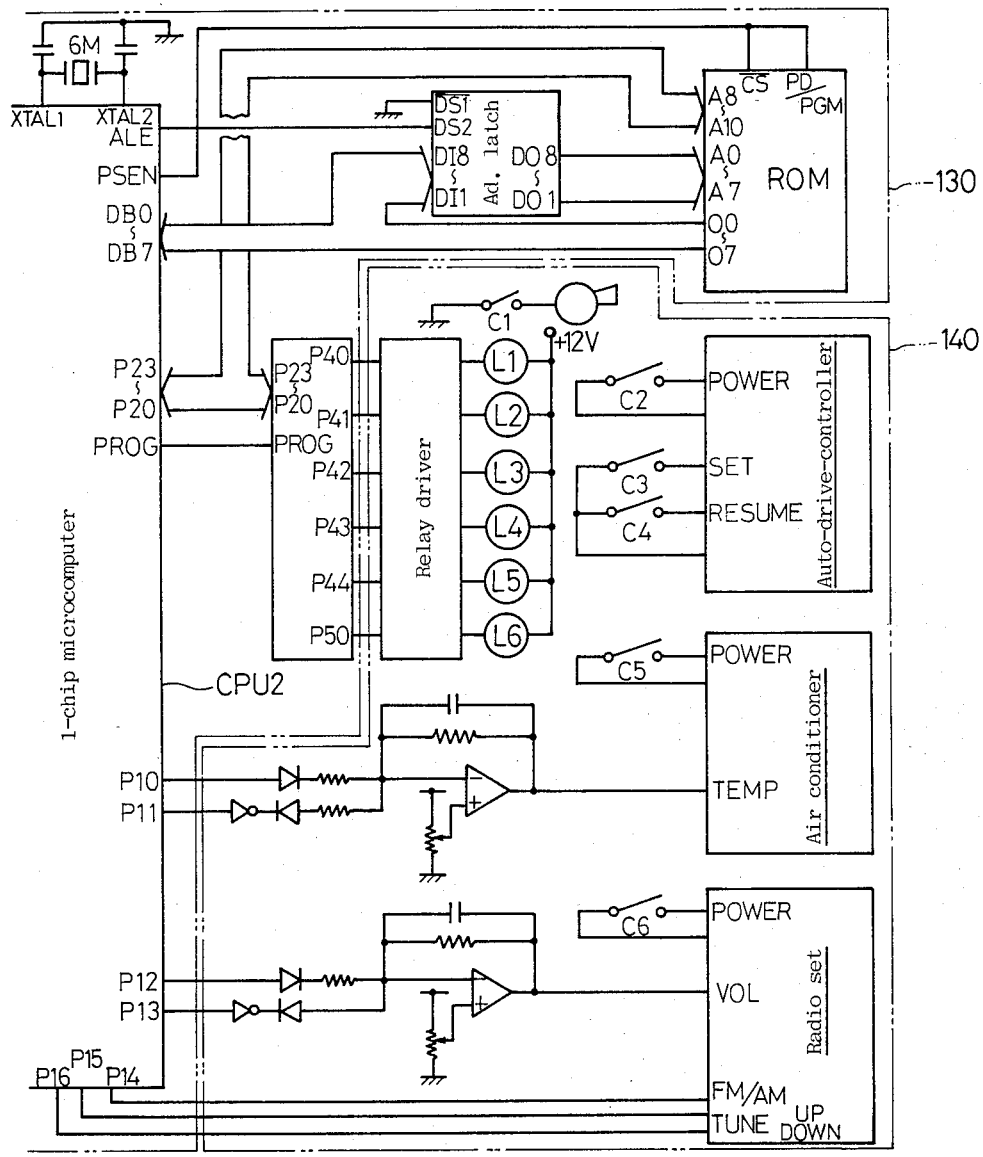

Referring to FIGS. 2e and 2f there is shown in detail the electric controller fixed on the vehicle at a position remote from the steering wheel 30, the fixed electric controller includes therein an FSK modulation circuit 150 (comprising a pulse oscillator 151, an FSK modulator 152, an output gate 153 and a transmitting-driver 154) and an FSK demodulation circuit (comprising an amplifying/waveform shaping circuit 161, a noise interrupting circuit 162 and an FSK demodulator 163), similarly to the control board 31. An air conditioner and a radio set are connected to the microcomputer unit 130 in a relay control mode. A read only memory ROM of the unit 130 stores therein control program data which is used to read the received code and then control the actuation of relays L1 to L6, as well as FSK transmitting/receiving control program data. FIG. 3d illustrates input and output signals for the FSK modulation circuits 100, 150 and the FSK demodulation circuits 110, 160 shown in FIGS. 2c and 2e. The manner of operation of the FSK modulation circuit 100 (500 operates in the same manner) and the FSK demodulation circuit 110 (160 operates in the same manner) will be now described by referring to FIG. 3d. Firstly, when an output port P24 of 1-chip microcomputer CPU1 assumes a high level H, the pulse oscillator 101 is actuated to generate a train of constant frequency pulses B. In this state, a high level H at an output port P25 causes output C from the modulator 102 to become pulses in synchronism with the pulses B, whereas a low level L at the output port P25 causes the output C to become pulses with half the frequency of the pulses B. Therefore, the output C gives the pulses B while P25 assumes an H level but gives pulses with half the frequency of the pulses B while P25 assumes a L level. Such output C is amplified by the driver 104 and then sent out to the power line SPL. A coupling capacitor is interposed between the transmitting driver 104 and the power line SPL, so that bi-polar pulses D appear on the SPL. When appearing on the power line SPL, those bi-polar pulses D are amplified by the amplifying/waveform shaping circuit 111 after passing through a coupling capacitor and shaped into positive pulse E, which in turn are applied to the noise interrupting circuit 112 so as to have a predetermined pulse width. More specifically, the high levels H of the positive pulses E are increased in width (as shown by F) and then integrated by the demodulation circuit 113 so as to be converted into an analog signal (denoted by H). This analog signal is further converted into a binary signal I assuming either a high level H or a low lovel L, which binary signal is applied to an input terminal To. The microcomputer CPU1 in the unit 80 causes the output port P25 to assume H in a time period of T and L in a subsequent time period of T and then allocates one combined cycle of 2T to 1 bit with the transmitting bit being of H, whereas the microcomputer CPU1 causes the output port P25 to assume H in a time period of ½ T and L in a subsequent time period of ½ T and then allocates one combined cycle of T to 1 bit with the transmitting bit being of L. In a receiving mode, the microcomputer CPU1 makes such a judgment that 1 bit of H has arrived if the input terminal To assumes H in a time period of T, or that 1 bit of L has arrived if the input terminal To assumes H in a time period of ½ T. The microcomputer CPU2 in the unit 130 also performs the processing or decoding of the transmitting-receiving signals in the same manner.

Figure 3A:
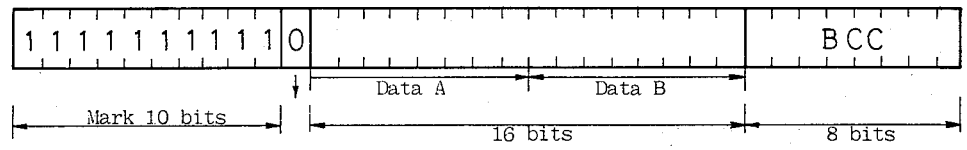
FIG. 3a is an explanatory view showing a bit arrangement of an electric signal sent from the control board 31 to the electric controller.
Figure 3B:
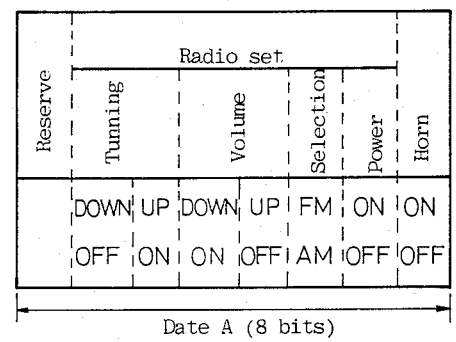
FIG. 3b is an explanatory view showing the content of data A in the electric signal.
Figure 3C:
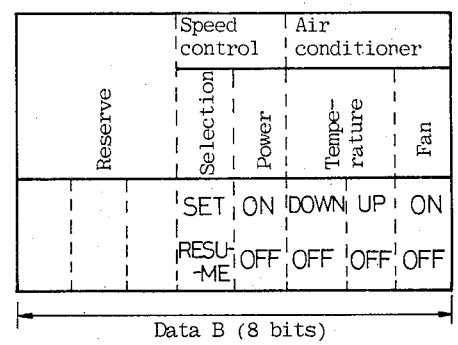
FIG. 3c is an explanatory view showing the content of data B in the electric signal.
Figure 3D:
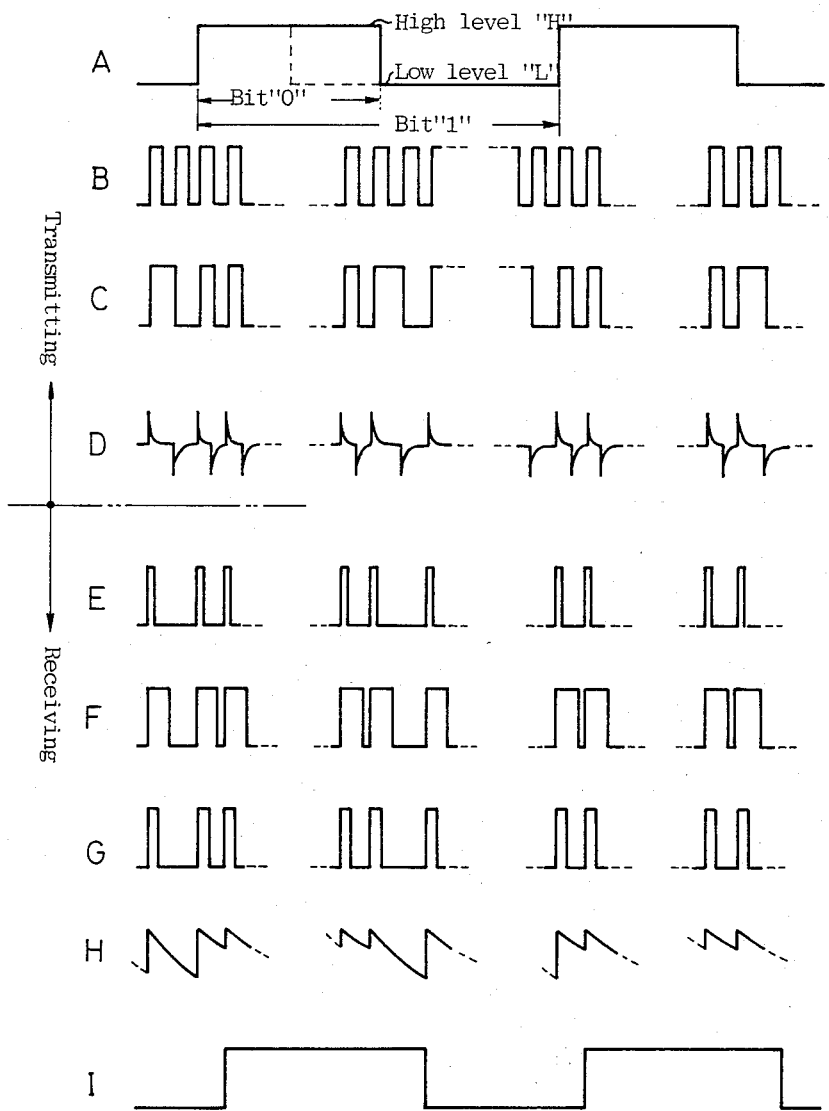
FIG. 3d is a time chart showing a transmitting signal from the control board 31 and a receiving signal of the electric controller.

As illustrated in FIG. 3a, a frame of the transmitting signal has a time-serial arrangement which comprises a mark code with 10 bits of H representing the head of the frame, 1 bit of L representing the beginning of data, 16 bits of data and 8 bits of CRC check bits. The data bits are further divided into two sections A, B each having 8 bits. As shown in FIG. 3b, the A group is allocated to data (key switch state informing bits) used for instructing the actuation of a horn and controlling the radio set, whereas the B group is allocated to data (key switch state informing bits) used for instructing a constant speed traveling control and controlling the air conditioner.

Figure 4A:
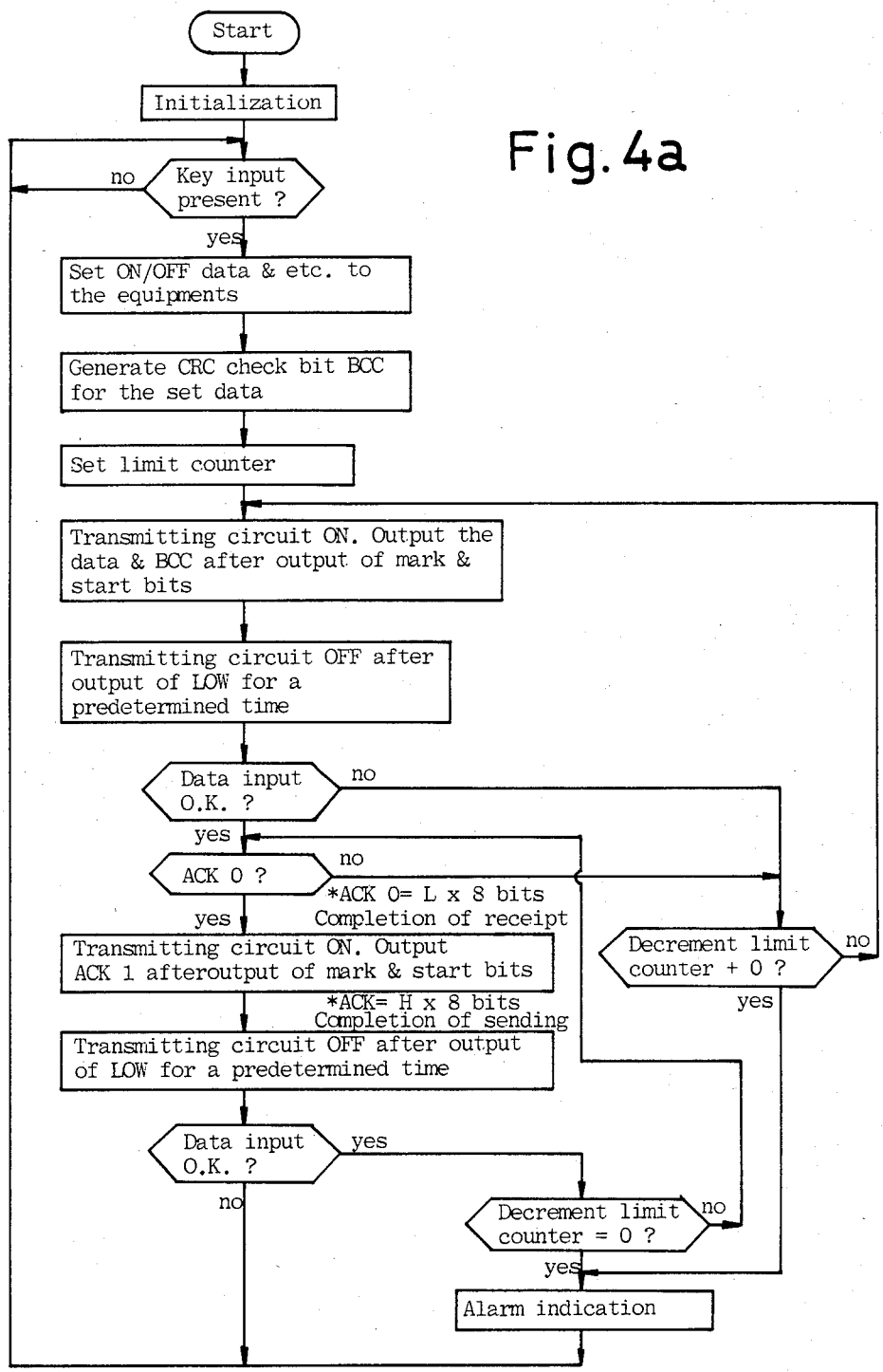
FIG. 4a is a flow chart showing the signal processing operation of a microcomputer CPU1 shown in FIGS. 2c and 2d.

FIG. 4a shows a flow chart for a transmitting/receiving control of the microcomputer unit 80 (FIG. 2c) incorporated in the control board 31. The transmitting-/receiving control of the unit 80 will be now described with reference to FIG. 4a. When power is fed to the CPU1 in the unit 80, the CPU1 initializes an input reading register and input/output ports I/O and then monitors the input ports of the I/O and its own input ports P13 to P10. If there occurs any change in state in response to the closing of keys or switches, individual bits at the input ports of the I/O and the input ports P13 to P10 are set in the input reading register. The content of the register is converted into transmitting data (data A plus data B) so as to form the CRC check bits BCC for the transmitting data. Then, a predetermined value is set in a counter (program counter) for checking a transmitting/receiving error and H is set at the output port P24 to allow the output port P25 to issue pulses with a cycle of 2T (when bit=H) or T (when bit=L) at a rate of 1 cycle to 1 bit in accordance with the individual bits of the mark code, start bit, data and the BCC. In this way, the bipolar pulses D corresponding to the serial bit arrangement of the transmitting frame (FIG. 3a) reaches the FSK demodulation circuit 160 of the fixed electric controller through the power line SPL - slip ring 46 - brush 48b, 48a -slip ring 45 - power line VPL. The bipolar pulses D are then demodulated, so that pulses similar to those sent out from the output port P25 of the CPU1 incorporated in the control board 31 are applied to the input port To of the CPU2 in the fixed electric controller.

After sending out 1 frame (FIG. 3a), the CPU1 in the control board 31 causes a timer (program timer) to turn on. At this time, the output port P25 issues pulses with a cycle of ½ T representing L. When the preset time is over, the output ports P24, P25 assume L at the same time and then, after turning the timer on, the CPU1 will wait until the input port To assumes H. If the input port To becomes H before the preset time is over, a time period of H is counted to decide whether the oncoming bit is of H or L and the data is stored in a receiving register while incrementing a bit number count register. Thereafter, this increment will be repeated in a similar manner every time a level at the input port To is changed from L to H. When the content of the count register reaches 19, the content (ACK) of the bits from 12th bit to 19th bit in the receiving register is checked. If all of those bits assume L (this represents the completion of receiving), the output port P24 is caused to assume H again and the output port P25 is allowed to issue pulses corresponding to the frame which comprises the mark code (10 bits), 1 start bit and the ACK 8 bits of H throughout. Next, the output port P25 is caused to assume L for a predetermined time period and then the output port P24 is turned to L. After that, the input port To is monitored for a predetermined time period. If the input port To assumes H during such monitoring time, the data is written in the receiving register in the same manner as mentioned above and then the data is read out while decrementing a limit counter. When the data provides the ACK 8 bits of L (the ACK represents a replying code composed of 8 bits and indicates the completion of receiving in the case that all bits assume L=0 or the completion of transmitting in the case that all bits assume H=1), this is considered to indicate the completion of receiving. If the input port To is not turned to H for a predetermined time period after receiving the code (ACK=L×8 bits) for the completion of receiving, the CPU1 in the control board 31 returns to the step of key input reading. In the case that the code (ACK=L=8 bits) for the completion of receiving is not fed in a predetermined time period after sending the data frame (FIG. 3a), the data frame is transmitted again while decrementing the limit counter. When the content of the limit counter becomes zero, it is assumed an anomaly so that an alarm lamp on the control board is set to illuminate and a flow returns to the step of key input reading. If the input port To is turned to H again after receiving the ACK (=L×8 bits) frame which represents the completion of receiving, the data is read out while decrementing the limit counter. With the data being of the ACK=L×8 bits, the ACK=H×8 bits which represents the completion of transmitting is sent out again, whereas with the data not being of the ACK=L×8 bits, the limit counter is further decremented. In the case that the limit counter becomes zero after receiving the ACK "0" which represents the completion of receiving, an alarm indication is set and a flow returns to the step of key input reading. During the key input reading, state signals on the input ports are read at intervals of a predetermined time period and then compared with memory bits stored in the input register. If any input is different from the memory bit in the input register, it is assumed that a key or switch input has occurred, and then the above mentioned transmitting and receiving will be carried out after writing the input state signals in the input register.

Figure 4B:
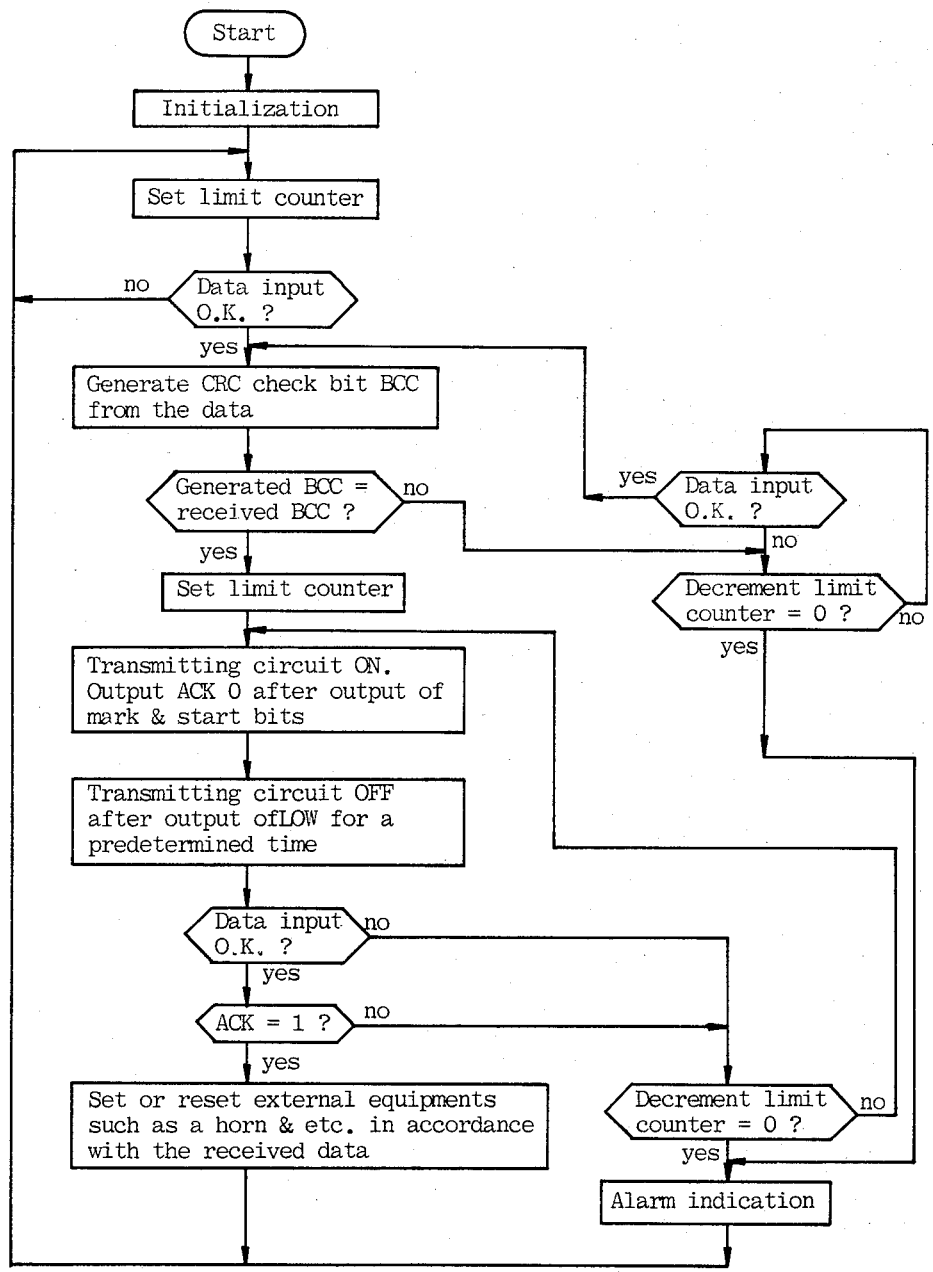
FIG. 4d is a flow chart showing the signal processing operation of a microcomputer CPU2 shown in FIGS. 2e and 2f.

FIG. 4b shows a flow chart for a receiving/transmitting control of the microcomputer CPU2 (FIG. 3b) incorporated in the fixed electric controller. This flow is similar to that of a transmitting/receiving control for the CPU1 in the control board, but different in that the CRC check bits are produced from the data bit and then compared with the received BCC so as to check an error in the transmitting and receiving, that after receiving with no error there is sent out a receiving completion frame formed by converting the data section of the data frame (FIG. 3a) into 8 bits of L (i.e. ACK "0"), and that the received data is converted into an equipment control code and then set on the output ports which are connected to the corresponding equipments 140.

According to the first embodiment as stated above, it becomes possible to transmit key inputs or switch operations on the control board to the control units or control panels fixed on the vehicle only by providing the power line between the control board on the steering wheel and the road-vehicle battery. As required, the transmitting can be performed also in the reverse direction. Cables for sending the electric signals can be eliminated, so that the structure around the steering mechanism will not be significantly complicated.

Furthermore, bi-directional remote instructions and controls are possible between the microcomputer units 80 and 180 provided that a display means, an informing means, small-sized units and others are connected to the unit 80 in the control board 31, key switches are connected to the unit 130 as desired, and both CPU's 1, 2 store therein programs permitting the execution of the control flows shown in FIGS. 4a and 4b, respectively. Although a FSK modulation and demodulation system is employed in the foregoing embodiment, alternative modulation and demodulation system being used for data communication is also applicable.

Figure 5A:
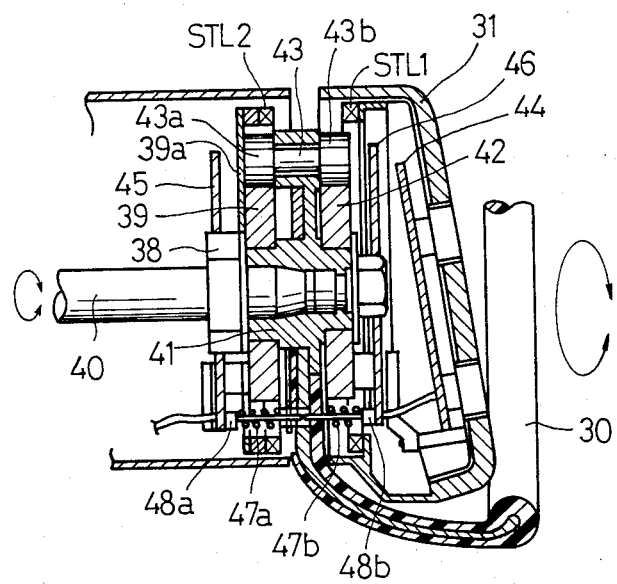
FIG. 5a is a longitudinal sectional view showing a combination of the slip rings 45, 46 and the brushes 48a, 48b and a pair of electric coils in accordance with a second embodiment of the invention.
Figure 5B:
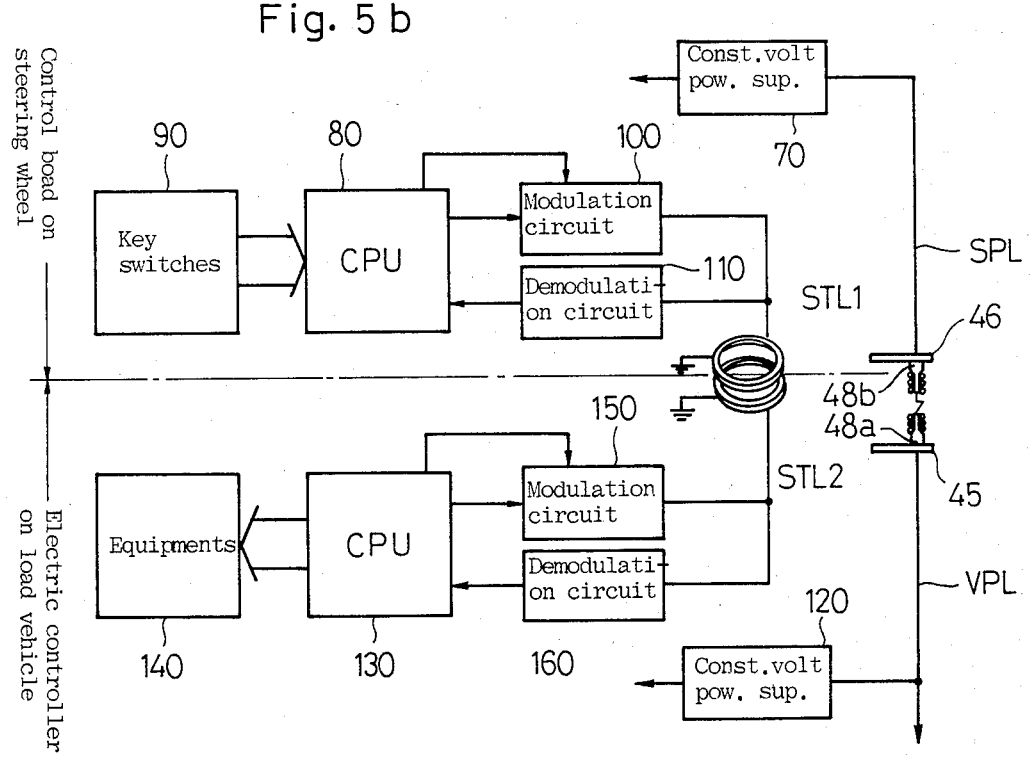
FIG. 5b is a block diagram showing a schematic constitution of the second embodiment.

FIGS. 5a, 5b, 5c and 5d show the respective parts of a second embodiment of the invention, which are different from those of the first embodiment hereinabove. Referring to FIG. 5a, a pair of electric coils STL1 and STL2 are rigidly mounted to the control board 31 and the stationary toothed wheel 39, respectively. These electric coils are disposed to face each other with a space therebetween, in which space the connecting member 43 is turned. Referring to FIG. 5b, the control board 31 includes therein the constant voltage power supply unit 70, the microcomputer unit 80 serving as a transmitting control device, the key switches 90, the FSK modulation circuit 100, the FSK demodulation circuit 110 and the coil STL1 for use in transmitting or receiving electric signals. The fixed electric controller on the load-vehicle battery side includes therein the constant voltage power supply unit 120, the microcomputer unit 130 serving as a receiving control device, the FSK modulation circuit 150, the FSK demodulation circuit 160 and the coil STL2 for use in transmitting or receiving electric signals. Various kinds of equipments 140 are connected to the microcomputer unit 130.

The constant voltage power supply unit 120 and the slip ring 45 fixed on the vehicle side are directly connected to the power line VPL of the road-vehicle battery, while the output terminal of the FSK modulation circuit 150 and the input terminal of the FSK demodulation circuit 160 are connected to the coil STL2. The brush 48a is brought into contact with the slip ring 45 and the other brush 48b connected to the brush 48a is brought into contact with the slip ring 46 fixed on the control board side. The slip rings 45, 46 are stationary, but the brushes 48a, 48b are turned upon a rotation of the steering wheel. To the coil STL1 there are connected the output terminal of the FSK modulation circuit 100 and the input terminal of the FSK demodulation circuit 110. The power line SPL on the control board side is connected to the constant voltage power supply unit 70. In this manner, the power line SPL on the control board side and the power line VPL on the fixed electric controller side are connected to each other through the slip rings 45, 46 and the brushes 48a,48b, thereby to constitute a power feeding line to the control board.

Figure 5C:
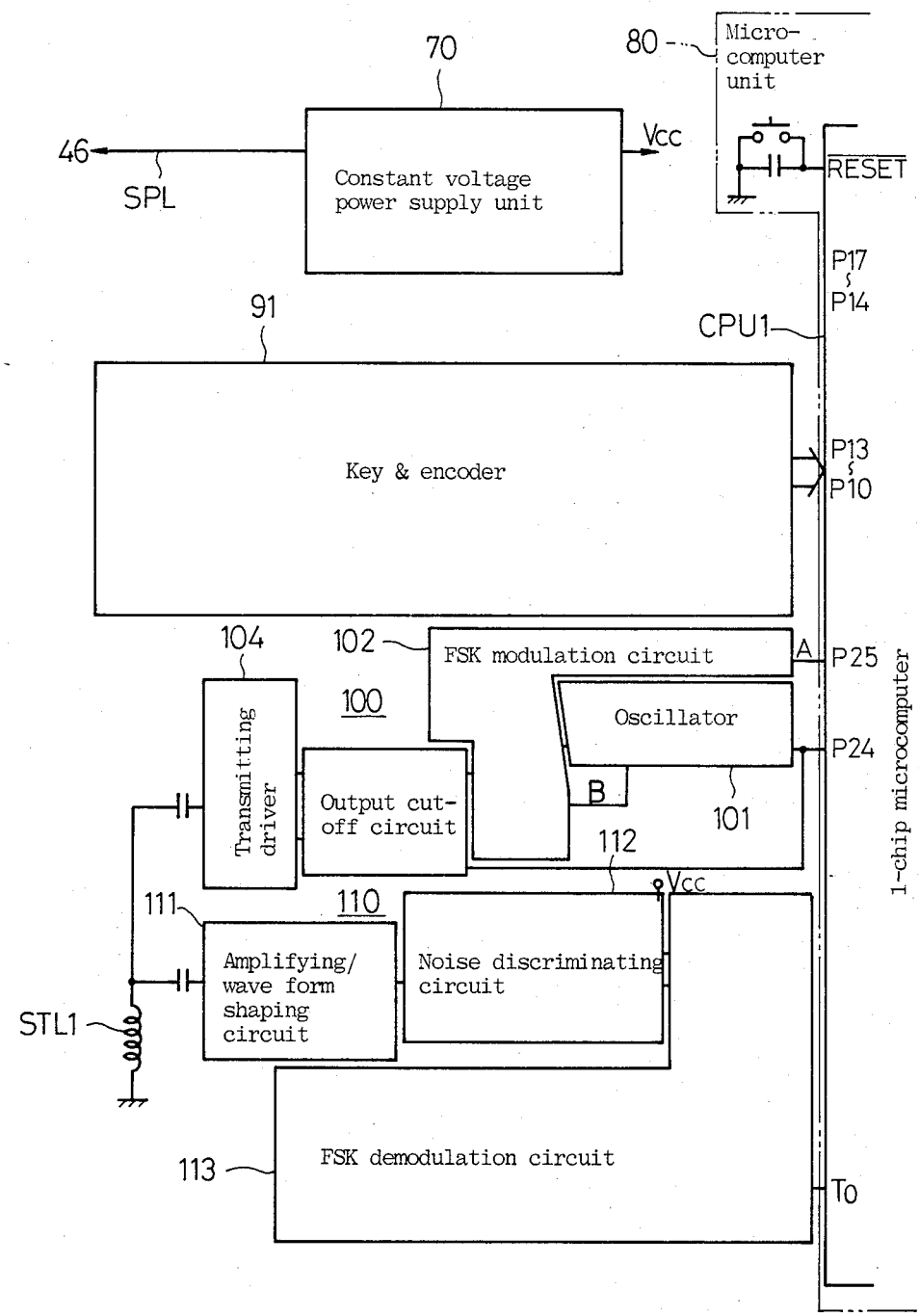
FIG. 5c is a block diagram showing a constitution of a part of the electric unit incorporated in the control board 31 in accordance with the second embodiment.

Referring to FIG. 5c, the power line SPL on the control board side is connected to the constant voltage power supply unit 70, while the coil STL1 is connected through a coupling capacitor to the transmitting driver 104 and the amplifying/waveform shaping circuit 111. Other parts in the electric circuit of the control board 31 have the same constitution as the first embodiment (FIGS. 2c and 2d). The CPU1 performs the transmitting/receiving control operation as shown in FIG. 4a.

Figure 5D:
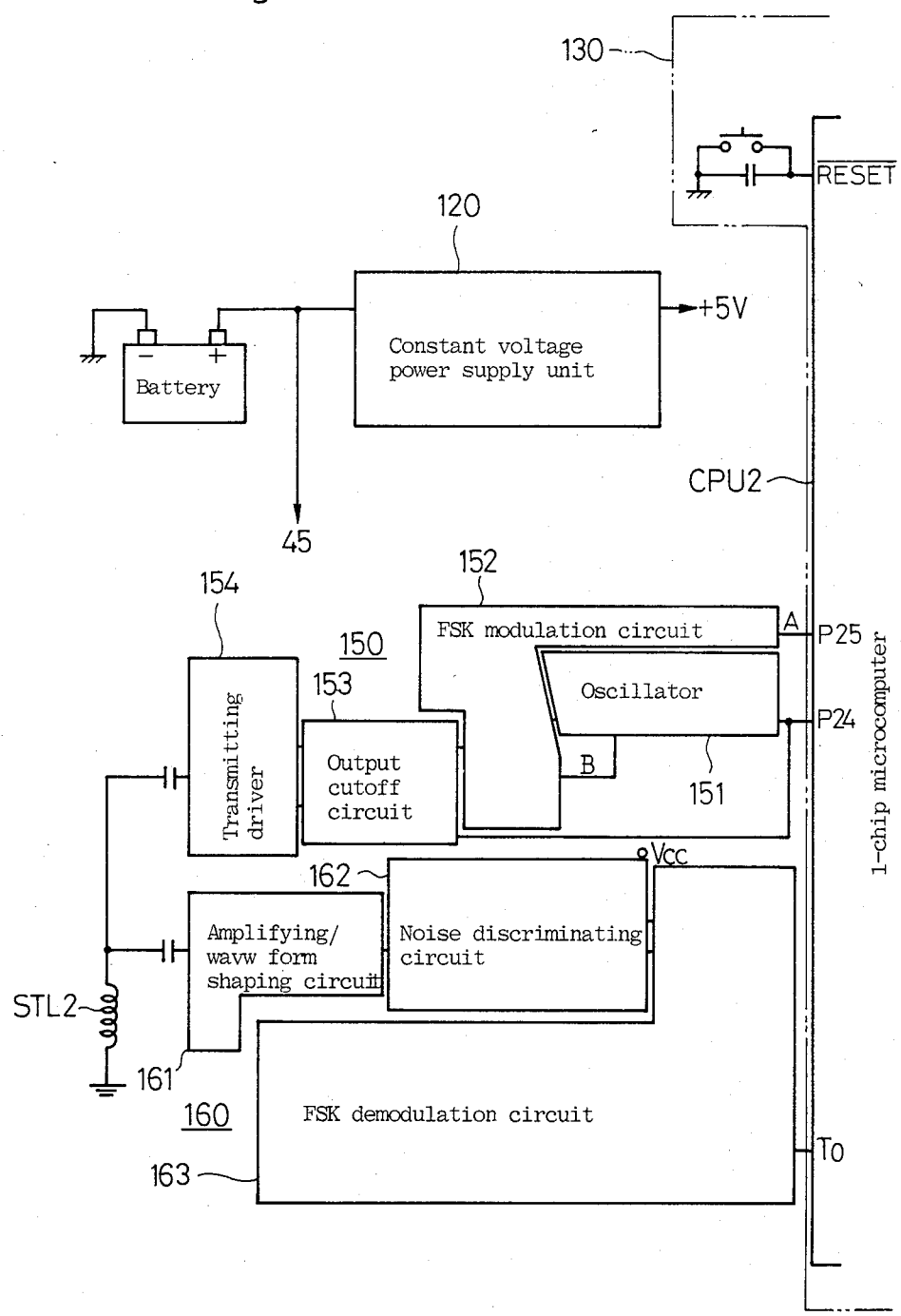
FIG. 5d is a block diagram showing a constitution of a part of the fixed electric controller in accordance with the second embodiment.

Referring to FIG. 5d, the slip ring 45 is connected to the battery, while the coil STL1 is connected through a coupling capacitor to the transmitting driver 154 and the amplifying/waveform shaping circuit 161. Other parts of the fixed electric controller have the same constitution as the first embodiment (FIGS. 2e and 2f). The CPU2 performs the transmitting/receiving control operation as shown in FIG. 4b.

According to the above second embodiment, it becomes possible to transmit key inputs or switch operations on the control board to the control units or control panels fixed on the vehicle only by providing the power line between the control board on the steering wheel and the road-vehicle battery and by disposing the electric coils on the control board side and the battery source side, respectively. As required, the transmitting can be performed also in the reverse direction. Cables for sending the electric signals can be eliminated, so that the construction around the steering mechanism will not be significantly complicated and will not require a larger space.

Figure 6:
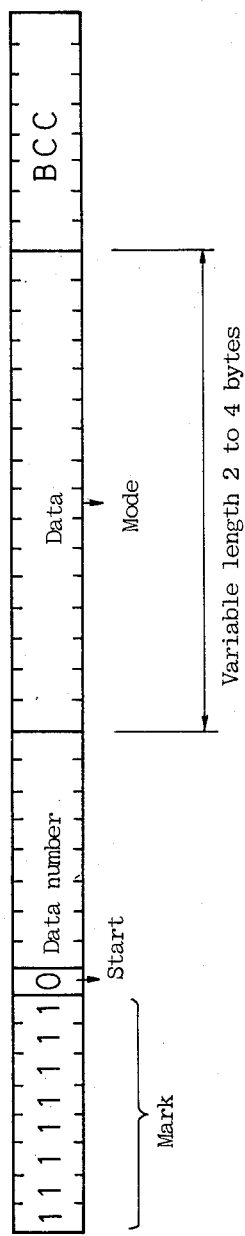
FIG. 6 is an explanatory view showing a bit arrangement of an alternative electric signal sent from the control board 31 to the electric controller.

Furthermore, bi-directional remote instructions and controls are possible between the microcomputer units 80 and 130 provided that a display means, an informing means, small-sized units and others are connected to the unit 80 in the control board 31, key switches are connected to the unit 130 as desired, and the both CPU's 1, 2 store therein programs permitting execution of the control flows shown in FIGS. 4a and 4b, respectively. In addition, the data frame to be transmitted or received is not limited to the arrangement as shown in FIG. 3a and can be modified to any desired alternative. For example, the data frame may include a data number code to make the data variable in the number of bits, as illustrated in FIG. 6. Although a FSK modulation and demodulation system is employed in the foregoing embodiment, an alternative modulation and demodulation system being used for data communication is also applicable.

Figure 7A:
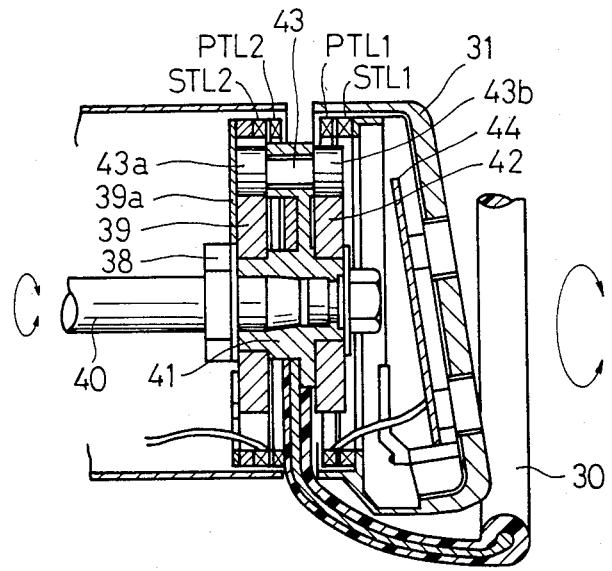
FIG. 7a is a longitudinal sectional view showing two pairs of electric coils in accordance with a third embodiment of the invention.
Figure 7B:
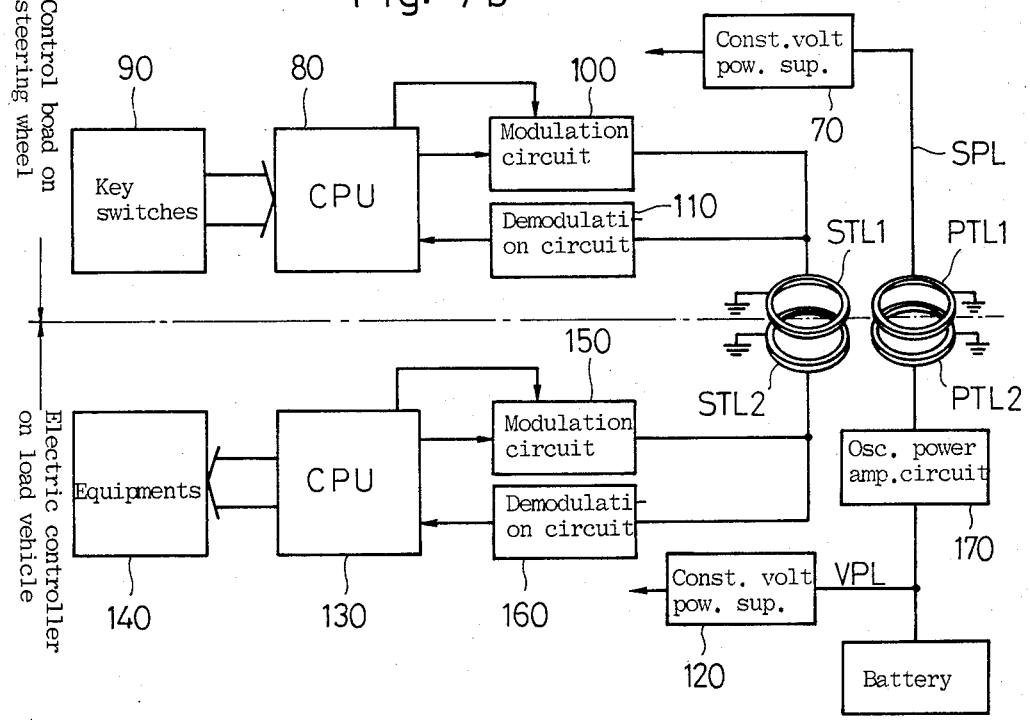
FIG. 7b is a block diagram showing a schematic constitution of the third embodiment.

FIGS. 7a, 7b, 7c and 7d show the respective parts of a third embodiment of the invention, which are different from those of the first embodiment as stated above. Referring to FIG. 7a, two electric coils STL1 and PTL1 are rigidly mounted on the control board 31, while two electric coils STL2 and PTL2 are rigidly mounted to the stationary toothed wheel 39. STL1 and PTL1 are disposed to face each other with a space therebetween, respectively, in which space the connecting member 43 is turned. Referring to FIG. 7b, the control board 31 includes therein the constant voltage power supply unit 70, the microcomputer 80 serving as a transmitting control device, the key switches 90, the FSK modulation circuit 100, the FSK demodulation circuit 110, the electric coil STL1 for use in transmitting or receiving electric signals, and the electric coil PTL1 for use in receiving the power. The fixed electric controller on the road-vehicle battery side includes therein the constant voltage power supply unit 120, the microcomputer unit 130 serving as a receiving control device, the FSK modulation circuit 150, the FSK demodulation circuit 160, the electric coil STL2 for use in transmitting or receiving electric signals, and the electric coil PTL2 for use in transmitting power. Various kinds of equipments 140 are connected to the microcomputer unit 130.

Figure 7C:
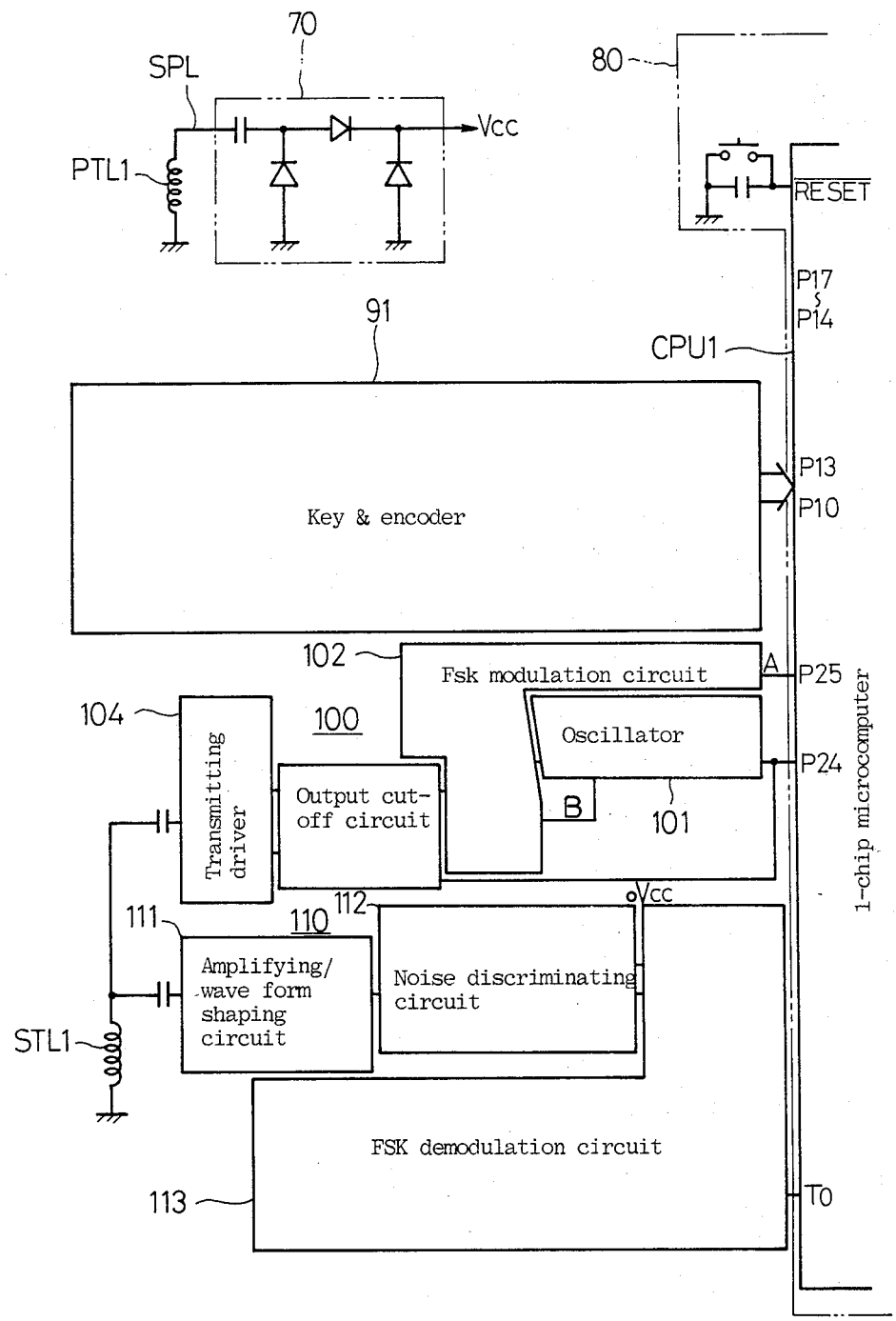
FIG. 7c is a block diagram showing a constitution of a part of the electric unit incorporated in the control board 31 in accordance with the third embodiment.
Figure 7D:
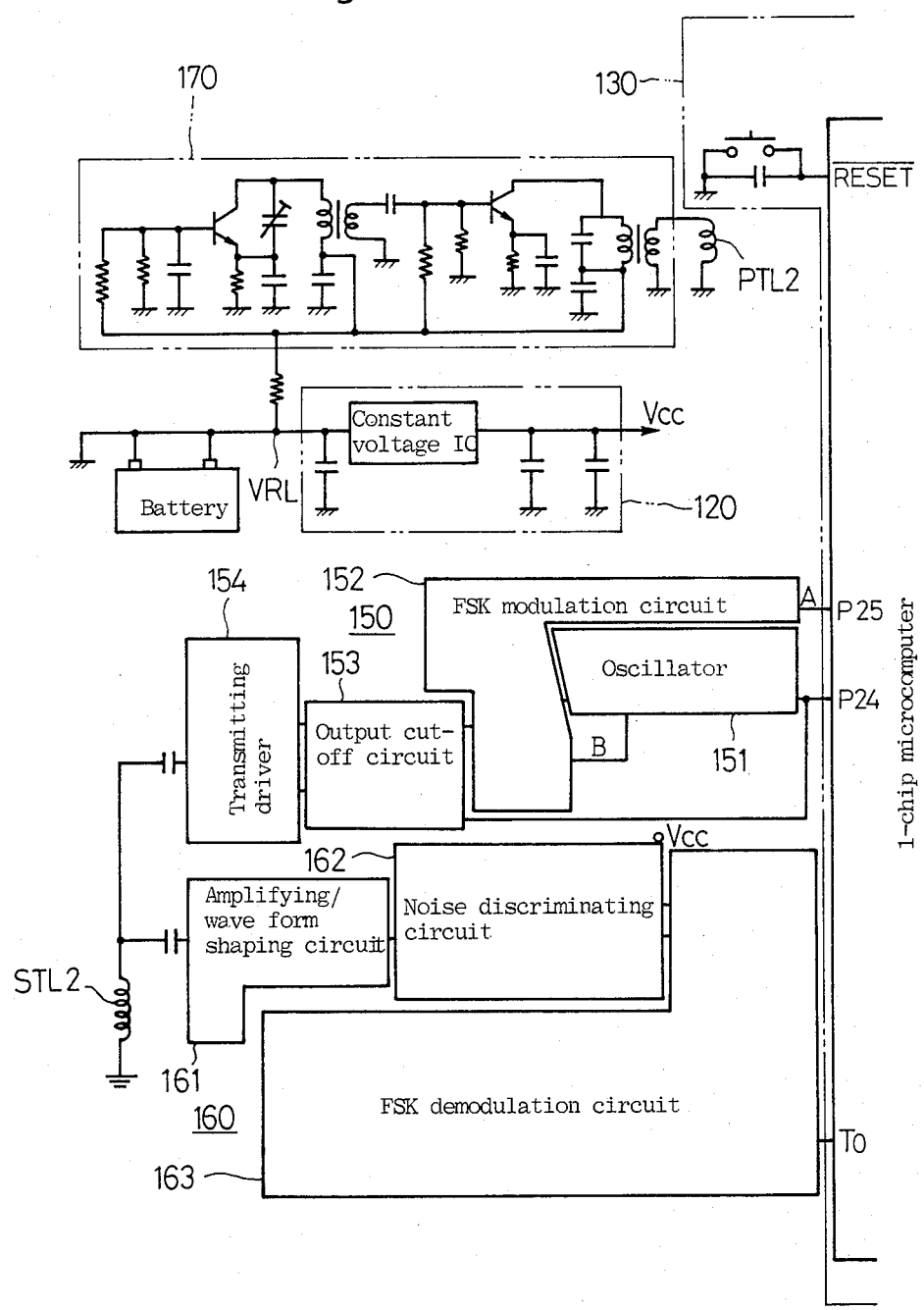
FIG. 7d is a block diagram showing a constitution of a part of the fixed electric controller in accordance with the third embodiment.

An oscillation/power amplifying circuit 170 and the constant voltage power supply unit 120 are connected to the power line VPL of the road-vehicle battery, while the electric coil PTL for use in transmitting power is connected to an output terminal of the circuit 170 and the electric coil STL2 is connected to the output terminal of the FSK modulation circuit 150 and the input terminal of the FSK demodulation circuit 160. The rectifying constant voltage circuit 70 is connected to the power line SPL on the control board side, which line in turn is connected to the coil PTL1. FIG. 7c shows a connecting diagram of the rectifying constant voltage circuit 70 in the control board 31. FIG. 7d shows a connecting diagram of the oscillation/power amplifying circuit 170 in the fixed electric controller.

In the foregoing third embodiment, the electric signals are transmitted between the control board 31 and the fixed electric controller through the pair of coils STL1 and STL2, while the power is fed to the control board 31 from the fixed electric controller through the pair of coils PTL1 and PTL2. The constitution of other parts and the manner of transmitting or receiving operation are the same as the first embodiment.

According to the third embodiment, it becomes possible to eliminate the need for connecting a power line and a communication line to the control board only by disposing the electric coils on both of the control board side and the fixed vehicle side, respectively. It becomes also possible to transmit key inputs or switch operations of the control board on the steering wheel to the control units or control panels fixed on the vehicle.

Furthermore, bi-directional remote instructions and controls are possible between the microcomputer units 80 and 130 provided that a display means, an informing means, small-sized units and others are connected to the unit 80 in the control board 31, key switches are connected to the unit 130 as desired, and the both CPU's 1, 2 store therein programs permitting execution of the control flows shown in FIGS. 4a and 4b, respectively.

In addition, it may be enough to provide only one pair of electric coils on both of the control board side and the fixed electric controller side to transmit the power and signals therebetween. For this purpose, a power transmitting wave is rendered to have low frequency and a signal transmitting wave is rendered to have high frequency, for example. On the control board 31 side, either one of the coils PTL1 and STL1 is dispensed with and the rectifying constant voltage circuit 70 is connected to the remaining coil. As required, the transmitting driver 104 may be connected to the amplifying/waveform shaping circuit 111 through a high-pass filter. On the fixed electric controller side, either one of the coils PTL2 and STL2 is dispensed with and the oscillation/power amplifying circuit 170 is connected to the remaining coil. As required, the transmitting driver 154 may be connected to the amplifying-/waveform shaping circuit 161 through a high-pass filter. Moreover, although the data is transmitted with FSK modulation and demodulation in the foregoing embodiment, an alternative modulation and demodulation system being used for data communication is also applicable.

What we claim is:

1. An electric signal transmission system between a control board on a steering wheel and an electric controller fixed to a road-vehicle, said road-vehicle including a road-vehicle power supply, said electric signal transmission system comprising:
    a control board supporting mechanism mounted on a steering wheel adapted to support said control board in a stationary state relative to said road-vehicle irrespective of rotation of said steering wheel;
    a plurality of input key switches, a modulation circuit, a transmitting control electronic device coupled to said modulation circuit for controlling transmission of information, and a first constant voltage power supply circuit (70) which are incorparated in said control board, said modulation circuit comprising a FSK modulation circuit (100) having a FSK modulator (102), an output cut-off gate (103) for controlling time divisional exchange and a coupling capacitor connected to a first electric line (SPL) for differentiating a FSK modulated binary signal and for transmitting the differentiated signal to said first electric line (SPL);
    an electric controller disposed on the road-vehicle at a position mechanically remote from said steering wheel and including a demodulation circuit, a receiving control electronic device coupled to said demodulation circuit for controlling reception of said information, and a second constant voltage power supply circuit; and
    an electric coupling means adapted to electrically couple said control board and said electric controller, said electric coupling means comprising: a first slip ring fixedly mounted to said control board; a high frequency interrupting coil (HCL1) for connecting said first constant voltage power supply circuit (70) to said first electric line (SPL), said first electric line being connected to said first slip ring; a second slip ring opposite said first slip ring, a second electric line (VPL) connected to said second slip ring with said demodulation circuit being coupled to said second electric line, and a second high frequency interrupting coil (HCL2) for coupling said second constant voltage power supply (120) and said road-vehicle power supply to said second electric line, and brushes brought into contact with both of said slip rings, whereby said slip rings conduct modulated communications between said modulation and demodulation circuits while simultaneously coupling said first and second constant voltage power supply circuits to said road-vehicle power supply.

2. An electric signal transmission system according to claim 1, wherein said control board includes a second demodulation circuit coupled to said first slip ring and said electric controller includes a second modulation circuit coupled to said second slip ring.

3. An electric signal transmission system according to claim 2, wherein said first and second modulation circuits are Frequency Shift Keying modulation circuits and said first and second demodulation circuits are Frequency Shift Keying demodulation circuits; said transmitting control electronic device forms, in response to the closing of said key switches, control data for road-vehicle equipment controlled by said electric controller, then provides the control data to said first modulation circuit, then returns to a key switch input standby state for awaiting reception from said second demodulation circuit of reception informing data indicating reception of the control data by said electric controller, and then again provides the control data to said first modulation circuit when said reception informing data is not received; and said receiving control electronic device provides the reception informing data to said second modulation circuit when receiving the control data from said first demodulation circuit and then provides operation instructions to the road-vehicle equipment in accordance with the control data.

4. An electric signal transmission system between a control board on a steering wheel and an electric controller fixed to a road-vehicle, said road-vehicle including a road-vehicle power supply, said electric signal transmission system comprising:

a control board supporting mechanism mounted on a steering wheel adapted to support said control board in a stationary state relative to said road-vehicle irrespective of rotation of said steering wheel;

a plurality of input key switches, a modulation circuit, a first electric line (SPL) and a transmitting control electronic device coupled to said modulation circuit for controlling transmission of information, all of which are incorporated in said control board, said modulation circuit comprising a FSK modulation circuit (100) having a FSK modulator (102), an output cut-off gate (103) for controlling time divisional exchange and a coupling capacitor connected to said first electric line for differentiating a FSK modulated binary signal and for transmitting said differentiated signal to said first electric line;

an electric controller disposed on the road-vehicle at a position mechanically remote from said steering wheel and including a demodulation circuit and a receiving control electronic device coupled to sais demodulation circuit for controlling reception of said information; and an electronic coupling means adapted to electrically couple said control board and said electric controller, said electric coupling means comprising a power coupling device for providing a source of electric power from said road-vehicle power supply to said control board and an electric coil device for conducting modulated communications between said control board and electric controller, said power coupling device comprising a first slip ring rigidly fixed to said control board and coupled to a power supply path of said control board, a second slip ring opposite said first slip ring and electrically connected to said road-vehicle power supply, and brushes brought into contact with both of said slip rings and rotated together with said steering wheel, and said electric coil device comprising a first electric coil rigidly fixed to said control board and coupled to said modulation circuit and a second electric coil opposite to said first electric coil and coupled to said demodulation circuit.

5. An electric signal transmission system according to claim 4, wherein the modulation circuit of said control board is coupled to said first electric coil and the demodulation circuit of said electric controller is coupled to said second electric coil.

6. An electric signal transmission system according to claim 5, wherein said control board includes a first constant voltage power supply circuit, said electric controller includes a second constant voltage power supply circuit, said first constant voltage power supply circuit is connected to said first slip ring, and said second slip ring is connected to a road-vehicle power supply and said second constant voltage power supply circuit.

7. An electric signal transmission system according to claim 6, wherein said control board includes a second demodulation circuit coupled to said first electric coil and said electric controller includes a second modulation circuit coupled to said second electric coil.

8. An electric signal transmission system according to claim 7, wherein said first and second modulation circuits and said first and second demodulation circuits are Frequency Shift Keying demodulation circuits; said transmitting control electronic device forms in response to the closing of said key switches control data for road-vehicle equipment controlled by said electric controller, then provides the control data to said first modulation circuit, then returns to a key switch input standby state for awaiting reception from said second demodulation circuit of reception informing data indicating reception of the control data by said electric controller, and then again provides the control data to said first modulation circuit when the reception informing data is not received; and said receiving control electronic device provides the reception informing data to said second modulation circuit when receiving the control data from said first demodulation circuit and then provides operation instructions to the road-vehicle equipment in accordance with the control data.

9. An electric signal transmission system between a control board on a steering wheel and an electric controller fixed to a road-vehicle, said road-vehicle including a road-vehicle power supply, said system comprising:

a control board supporting mechanism mounted on a steering wheel adapted to support said control board in a stationary state relative to said road-vehicle irrespective of rotation of said steering wheel;

a plurality of input key switches, a modulation circuit, a first electric line (SPL), a transmitting control electronic device coupled to said modulation circuit for controlling transmission of information, and a rectifying power supply circuit which are incorporated in said control board, said modulation circuit comprising a FSK modulation circuit (100) having a FSK modulator (102), and output cut-off gate (103) for controlling time divisional exchange and a coupling capacitor connected to said first electric line for differentiating a FSK modulated binary signal and for transmitting said differentiated signal to said first electric line;

an electric controller disposed on said road-vehicle at a position mechanically remote from said steering wheel and including a demodulation circuit, a receiving control electronic device coupled to said demodulation circuit for controlling reception of said information, a constant voltage power supply circuit for providing power to circuits of said electric controller, and an oscillation/amplifying circuit; and an electric coupling means adapted to electrically couple said control board and said electric controller, said electric coupling means including a power coupling device for coupling said road-vehicle power supply to said control board and a communication coupling device for conducting modulated communications between said control board and electric controller, said communication coupling device comprising a first electric coil rigidly mounted to said control board and coupled to said modulation circuit and a second electric coil opposite said first electric coil and coupled to said demodulation circuit, and said power coupling device comprising a third electric coil rigidly mounted to said control board and connected to said rectifying power supply circuit and a fourth electric coil opposite said third electric coil and coupled to said oscillation/amplifying circuit.

10. An electric signal transmission system according to claim 9, wherein said control board includes a second demodulation circuit coupled to said first electric coil and said electric controller includes a second modulation circuit coupled to said second electric coil.

11. An electric signal transmission system according to claim 10, wherein said first and second modulation circuits are Frequency Shift Keying modulation circuits and said first and second demodulation circuits are Frequency Shift Keying demodulation circuits; said transmitting control electronic device forms in response to the closing of said key switches control data for road-vehicle equipment controlled by said electric controller, then provides the control data to said first modulation circuits, then returns to a key switch input standby state for awaiting reception from said second demodulation circuit of reception informing data indicating reception of said the control data by said electric controller, and then again provides the control data to said first modulation circuit when the reception informing data is not received; and said receiving control electronic device provides the reception informing data to said second modulation circuit when receiving the control data from said first demodulation circuit and then provides operation instructions to the road-vehicle equipment in accordance with the control data.

* * * * *